United States Patent
Frascella (10) Patent No.: US 10,462,953 B2
(45) Date of Patent: Nov. 5, 2019

(54) TOWING APPARATUS FOR AGRICULTURAL MACHINES, OF THE TYPE OF BALERS, ROUND BALERS AND THE LIKE

(71) Applicant: KVERNELAND GROUP RAVENNA S.R.L., Russi (IT)

(72) Inventor: Cosimo Frascella, San Giorgio Jonico (IT)

(73) Assignee: KVERNELAND GROUP RAVENNA S.R.L., Russi (IT)

( * ) Notice: Subject to any disclaimer, the term of this patent is extended or adjusted under 35 U.S.C. 154(b) by 0 days.

(21) Appl. No.: 15/519,605

(22) PCT Filed: Oct. 12, 2015

(86) PCT No.: PCT/EP2015/073601
§ 371 (c)(1),
(2) Date: Apr. 17, 2017

(87) PCT Pub. No.: WO2016/059008
PCT Pub. Date: Apr. 21, 2016

(65) Prior Publication Data
US 2017/0245417 A1     Aug. 31, 2017

(30) Foreign Application Priority Data
Oct. 15, 2014   (EP) .................................... 14425131

(51) Int. Cl.
*A01B 59/043* (2006.01)
*B60D 1/44* (2006.01)
*A01F 15/08* (2006.01)

(52) U.S. Cl.
CPC ............ *A01B 59/043* (2013.01); *A01F 15/08* (2013.01); *B60D 1/44* (2013.01)

(58) Field of Classification Search
CPC ...... A01B 59/042; A01B 59/043; A01B 63/14; B60D 1/44
(Continued)

(56) References Cited

U.S. PATENT DOCUMENTS 2,316,397 A * 4/1943 Briscoe ................ A01B 59/042
172/206
2,357,761 A * 9/1944 Peacock ............... A01B 59/042
280/412

(Continued)

FOREIGN PATENT DOCUMENTS

DE    102009047585 A1    6/2011
EP       0948882 A1    10/1999
(Continued)

OTHER PUBLICATIONS

International Search Report and Written Opinion of Application No. PCT/EP2015/073601 dated Feb. 23, 2016; 10 pages.

*Primary Examiner* — Gary S Hartmann
(74) *Attorney, Agent, or Firm* — Kraguljac Law Group, LLC (57) ABSTRACT

A towing apparatus for agricultural machines of the type of balers and round balers. The towing apparatus includes a first member, which can be coupled to the agricultural machine and is associated with a second member. The second member is in turn associated with a third member, which can be coupled to a tractor for towing the agricultural machine. Either or both of the first member and the second member is controlled by at least one respective actuator, for the movement of the agricultural machine at least partially independently of the advancement of the tractor.

14 Claims, 7 Drawing Sheets

(58) Field of Classification Search
USPC .................. 172/439; 56/14.9, 15.5; 280/447
See application file for complete search history.

(56) References Cited

U.S. PATENT DOCUMENTS

| | | | | |
|---|---|---|---|---|
| 4,167,843 | A | * | 9/1979 | Kampman .......... A01F 15/0765 56/16.4 R |
| 4,433,533 | A | | 2/1984 | Giani |
| 4,838,358 | A | * | 6/1989 | Freudendahl .......... A01B 59/04 172/125 |
| 4,903,470 | A | * | 2/1990 | Hemker ............... A01D 41/144 172/311 |
| 4,940,096 | A | * | 7/1990 | Johnson ............... A01B 59/043 172/443 |
| 5,201,167 | A | | 4/1993 | Rowse |
| 5,203,154 | A | * | 4/1993 | Lesher .................. A01D 57/12 56/366 |
| 5,335,856 | A | * | 8/1994 | Nathan ................ A01B 59/042 172/324 |
| 5,450,717 | A | * | 9/1995 | Delperdang ........... A01D 57/20 56/366 |
| 5,997,024 | A | | 12/1999 | Cowley |
| 6,546,708 | B2 | * | 4/2003 | Faivre .................. A01B 59/042 56/15.2 |
| 6,662,540 | B1 | * | 12/2003 | Harkcom ............. A01B 73/005 56/15.5 |
| 7,353,885 | B2 | | 4/2008 | Nordhoff |
| 7,422,226 | B2 | * | 9/2008 | Hsueh ...................... B60D 1/32 280/455.1 |
| 9,232,688 | B2 | | 1/2016 | Kormann et al. |
| 9,706,697 | B2 | * | 7/2017 | Wilkening .......... A01B 69/004 |
| 2004/0212176 | A1 | | 10/2004 | Colistro |
| 2012/0240546 | A1 | | 9/2012 | Kormann |

FOREIGN PATENT DOCUMENTS

| | | |
|---|---|---|
| EP | 1514463 A1 | 3/2005 |
| FR | 2703955 A1 | 10/1994 |
| SU | 1347878 A1 | 10/1987 |
| WO | 2012041743 A1 | 4/2012 |

* cited by examiner

TOWING APPARATUS FOR AGRICULTURAL MACHINES, OF THE TYPE OF BALERS, ROUND BALERS AND THE LIKE

CROSS-REFERENCE TO RELATED APPLICATION

This application is the U.S. national phase of PCT Application No. PCT/EP2015/073601 filed on Oct. 12, 2015, which claims priority to European Application No. 14425131.1 filed Oct. 15, 2014, the disclosures of which are incorporated in their entirety by reference herein.

The present invention relates to a towing apparatus for agricultural machines, of the type of balers, round balers and the like.

As is known, in the agricultural sector there is often the necessity to gather previously-cut products from the ground, such as grass, wheat, maize, hay, forage, and the like, in order to be able to subsequently compress them into bales of various shapes and sizes.

The bales can in fact be easily transported and stored (or more generally, enable a simpler management of the agricultural products that make them up, as a function of the specific purposes for which they are destined).

In order to form the bales, the use is frequent of agricultural machines, called "balers" or "forage presses", which are first of all provided with a pick-up apparatus, which is capable of picking up the agricultural products that the machine progressively encounters during its advancement.

At the rear of the above mentioned apparatus, such machines are further provided with a chamber for the compression of the agricultural products (which are received from the pick-up apparatus), so as to be able to carry out the formation of the bale.

Among the various different types of machines that are covered by the above mentioned category, a role of undoubted importance is occupied by "round balers", which produce cylindrical bales.

Although sometimes the pick-up apparatus, the chamber and the drive unit all form part of the same vehicle, and thus move on the ground supported by the same chassis, usually round balers are substantially constituted by a an operating unit (provided with the pick-up apparatus and the chamber) that has to be towed by an independent tractor, which in turn is driven by a driver.

The coupling between the tractor and the operating unit is thus obtained by way of a towing device, which according to methods that are now widely consolidated comprises a towbar arranged according to the direction of travel, which extends at the front of the operating unit and is typically rigidly coupled thereto. At its free end the towbar is provided with means of fixed rotatable engagement with the tractor, and, in the latter case, such means usually comprise a ring-shaped element, called "towing eye", which can accommodate, rotatably, a pin that is rigidly coupled to the rear portion of the tractor.

However, such implementation solutions are not devoid of drawbacks. It should in fact be observed that, after harvesting, usually the agricultural products are gathered along ordered rows (called "windrows"), which are distributed along the agricultural ground, and which thus define the path along which the agricultural machine has to be progressively moved.

Moreover, for various reasons the windrows sometimes do not have a regular and linear progression (or constant width), and/or the agricultural products are not evenly distributed along them.

In such circumstances, the driver of the tractor is forced to perform continual detours and/or complex maneuvers, in order to "follow" the irregularities of the windrow and prevent the bale formation chamber from being fed in a patchy and uneven manner over time, since this would result in the production of bales that are in turn incomplete or uneven.

Moreover, for the driver it is not always possible or in any case practical to perform the necessary maneuvers and in any case it seems clear that the need to perform continual detours and course adjustments is wholly inconvenient and results in an increase in the time necessary to complete the gathering, with consequent unwelcome decrease in productivity.

The aim of the present invention is to solve the above mentioned problems by providing a towing apparatus for balers, round balers, and similar agricultural machines, that ensures the optimal formation of the bale, even in the event of uneven distribution on the ground of the agricultural products to be picked up and compressed.

Within this aim, an object of the invention is to provide a towing apparatus that ensures the optimal formation of the bale, without requiring constant corrections to the course of the tractor, in order to follow any irregularities of the windrow.

Another object of the invention is to provide a towing apparatus that ensures the optimal formation of the bale, without requiring the driver to constantly check the distribution of the agricultural products on the ground, in order to make the necessary corrections.

Another object of the invention is to provide a versatile towing apparatus, that can be effectively coupled to tractors of different types and/or destined for different markets, in compliance with local regulations governing the sector.

Another object of the invention is to provide a towing apparatus that ensures a high reliability of operation.

Another object of the invention is to provide a towing apparatus that can be easily implemented using elements and materials that are readily available on the market.

Another object of the invention is to provide a towing apparatus that is low cost and safely applied.

This aim and these objects are achieved by a towing apparatus for agricultural machines of the type of balers, round balers and the like, which comprise at least one device for gathering previously-cut agricultural products, of the type of grass, wheat, maize, hay, forage, and the like, and a chamber for the accommodation and compression of the agricultural products, which are received from the gathering device, for the formation of a bale, characterized in that it comprises at least one first member, which can be coupled to the agricultural machine and is associated with a second member, said second member being in turn associated with a third member, which can be coupled to a tractor for towing the agricultural machine, either or both of said first member and said second member being controlled by at least one respective actuator, for the movement of the agricultural machine at least partially independently of the advancement of the tractor.

Further characteristics and advantages of the invention will become better apparent from the description of a preferred, but not exclusive, embodiment of the towing apparatus according to the invention, which is illustrated by way of non-limiting example in the accompanying drawings wherein.

With reference to the figures, the reference numeral 1 generally designates a towing apparatus for agricultural machines A of the type of balers, round balers and the like: as is known, the machines A comprise first of all at least one device B for gathering previously-cut agricultural products, of the type of grass, wheat, maize, hay, forage, and the like.

Furthermore, the agricultural machine A comprises a chamber C for the accommodation and compression of the agricultural products, which are received from the gathering device B, in order to thus be capable of forming a bale (which is usually, but not exclusively, cylindrical).

In more detail therefore, in the preferred application the apparatus 1 is intended for the towing of machines A of the substantially known type described above, for the purpose of moving them along a piece of agricultural land and first of all gathering the above mentioned agricultural products, which usually have already been cut and are on the ground, piled so as to form one or more ordered rows, called windrows.

The gathering device B picks up the agricultural products, usually by way of a plurality of torsion springs that are made to rotate about a horizontal axis by a shaft facing the ground, and, with the aid of adapted cowlings, feeds those agricultural products into the chamber C, in which they are compressed according to conventional methods until the desired bale is formed.

Although in the preferred application, which is repeatedly referred to in the present discussion, the agricultural machine A is of the type of a roto-baler and the like, adapted to the formation of a usually cylindrical bale A, it should be noted however that the possibility is not ruled out of adopting the apparatus 1 according to the invention for towing other types of agricultural presses, or even for other agricultural machines A, while remaining within the scope of protection claimed herein.

According to the invention, the towing apparatus 1 comprises first of all at least one first member 2, which can be coupled to the agricultural machine A and is associated with a second member 3. Furthermore, the second member 3 is in turn associated with a third member 4; the latter can be coupled to a tractor D (which is also for example conventional), when it is desired to perform the towing of the agricultural machine A.

In addition, either or both of the first member 2 and the second member 3 is controlled by at least one respective actuator 5, in order to move the agricultural machine A at least partially independently of the advancement of the tractor D and so be able to follow the irregularities of distribution of the agricultural products, while maintaining a constant advancement direction E for the tractor D (and thus achieving, from this point onward, the set aim).

In particular, the first member 2, which can be coupled rigidly to the agricultural machine A (according to methods that will be explained in the following pages for the purposes of non-limiting example), is pivoted at the opposite end to the second member 3 about a first substantially vertical rotation axis F.

In the embodiment illustrated in the accompanying figures, it is furthermore the second member 3 that is controlled by the actuator 5, which in turn is connected at the opposite end to the third member 4.

The third member 4, which can be coupled rigidly to the tractor D according to methods that will also be explained in the following pages for the purposes of non-limiting example, is pivoted to the second member 3 about a second substantially vertical rotation axis G (and thus parallel to the first axis F).

Figure 1:
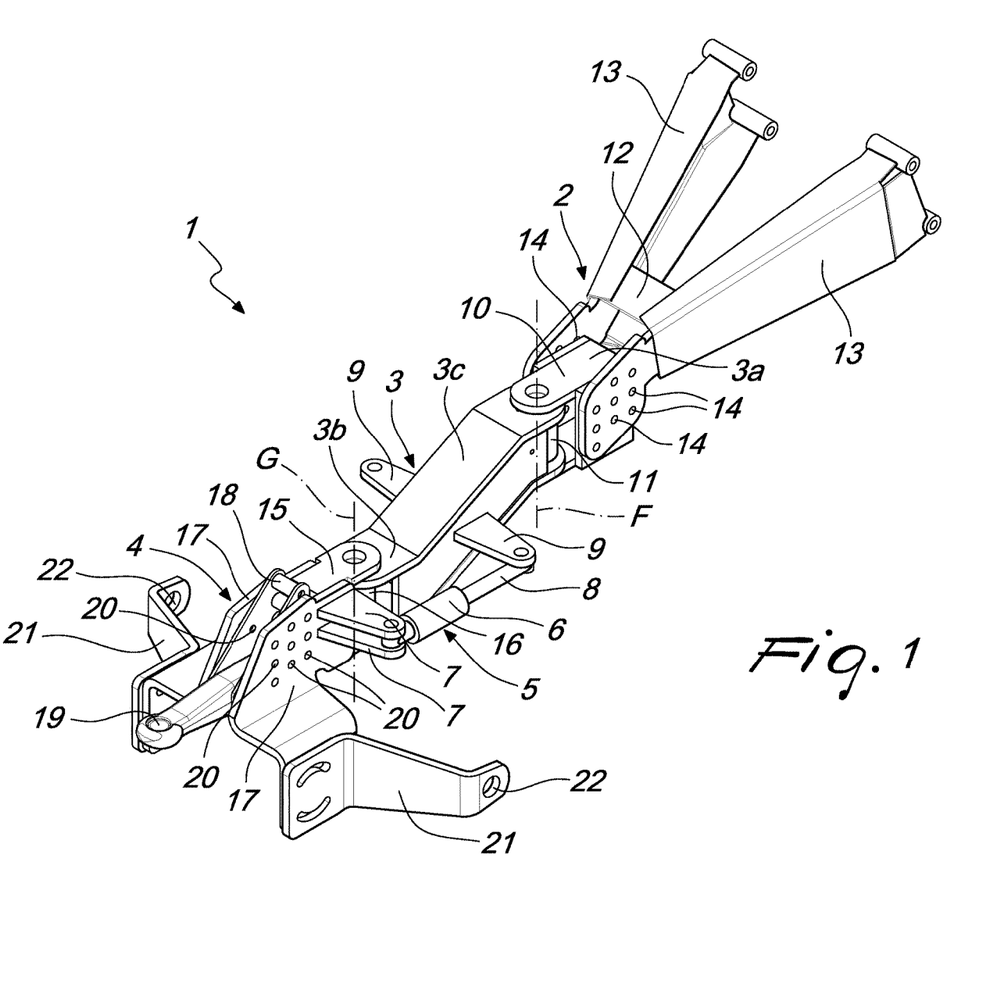
FIG. 1 is a perspective view of the towing apparatus according to the invention.
Figures 2, 3:
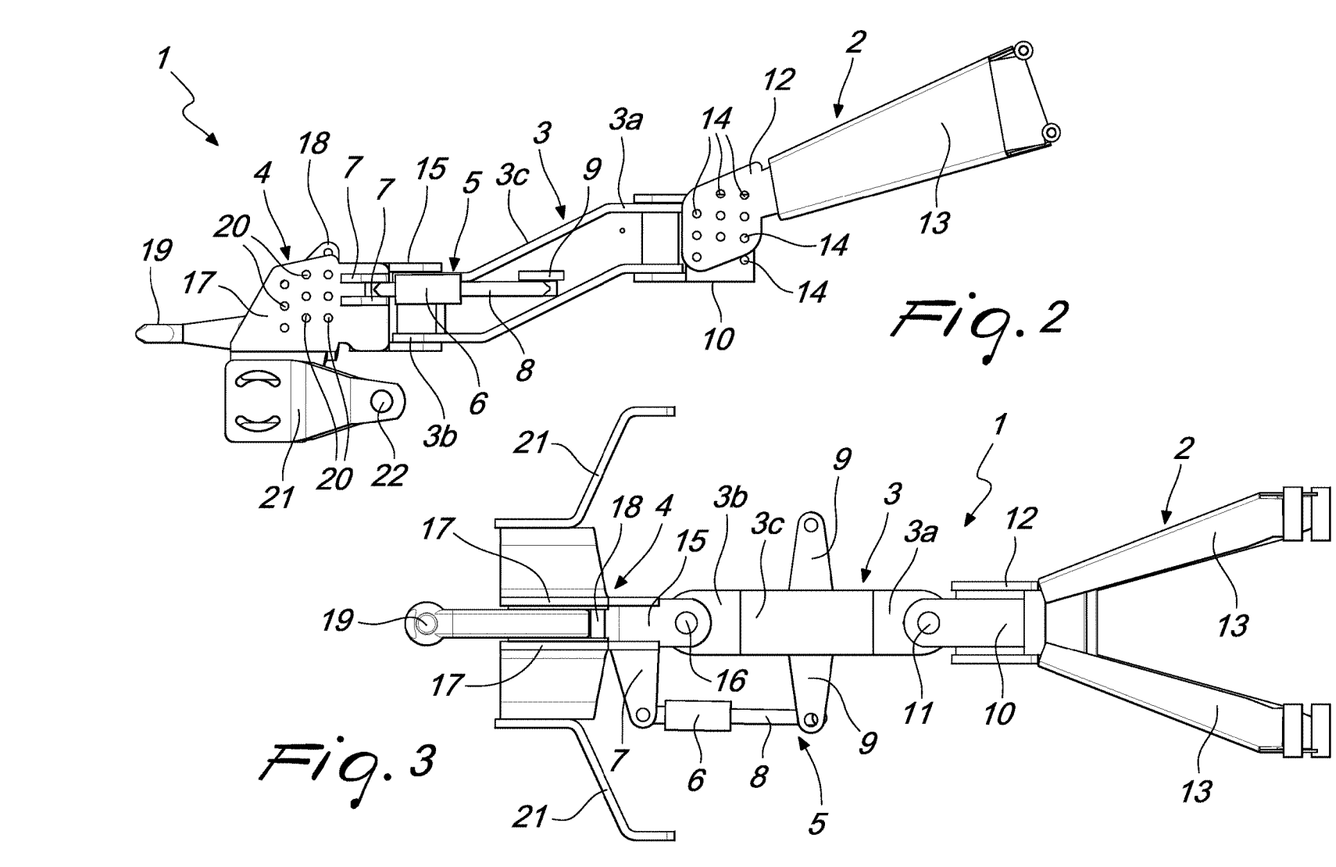
FIG. 2 is a side view of the towing apparatus in FIG. 1.
FIG. 3 is a view from above of the towing apparatus in FIG. 1.

Even more specifically, and as can be seen clearly from FIGS. 1, 2 and 3, in the preferred embodiment the actuator 5 is constituted substantially by a hydraulic cylinder, which comprises first of all a substantially cylindrical jacket 6, which is articulated with one of its ends to at least one contoured tab 7, protruding from the third member 4. Furthermore, the cylinder comprises a piston 8, which is at least partially slideable within the jacket 6 and is articulated, with its free end, to a contoured crest 9 protruding from the second member 3.

The sliding of the piston 8 in the jacket 6, which can be driven according to the methods that will for example be described below, determines the rotation of the second member 3 about the second axis G and, consequently, the rotation about the first axis F of the first member 2, and, with the latter, of the agricultural machine A.

It should still be noted however that the possibility is not ruled out of using one or more actuators 5 of different type, for the movement of the second member 3 (or of the first member 2), while remaining within the scope of protection claimed herein.

Conveniently, the towing apparatus 1 according to the invention comprises automatic means of control and management of the actuator 5 (or of the actuators 5, in embodiments that have two or more thereof), in order to be able to automatically activate it, and thus obtain, as a consequence, the automatic movement of the agricultural machine A independently of the advancement direction E of the tractor D.

In particular, in the preferred embodiment, the automatic means of control and management comprise at least one detection sensor, direct or indirect, of the pressure, which can be arranged in the chamber C of the agricultural machine A.

Furthermore, the automatic means comprise an electronic unit for driving the actuator 5, which is associated with the sensor (or sensors), and which can be arranged on board the tractor D or on board the agricultural machine A, according to specific requirements.

Thanks to such components, it is thus possible to automatically activate the actuator 5 (in order to move the agricultural machine A) in the presence of irregularities in the bale formation process, in that such irregularities, as is known, can be detected by way of monitoring the progression of the pressure value inside the chamber C, such monitoring being performed by the sensor (or sensors).

In more detail, as a function of the information acquired by way of the sensor (or sensors), the control unit (a controller or a PLC for example) can act on hydraulic valves that are connected to the hydraulic cylinder (or hydraulic cylinders).

It should be noted that the sensors can be selected from any type, and be adapted to detect the pressure value in one or more conveniently selected points of the chamber C (the value being directly correlated to the progressive filling of the chamber C with the agricultural products).

For example, although the possibility is not ruled out of adopting sensors capable of detecting the pressure directly, each sensor can be a potentiometer, capable of monitoring the pressure, and thus the filling of the chamber C, by way of the measurement of the movement or of the oscillation (depending, as noted, on the pressure value) of a respective reference plate, which is conveniently arranged in the chamber C.

The possibility is not ruled out moreover of identifying other values to monitor, during the bale formation process, for the purposes in any case of making available to the electronic unit the data necessary to promptly identify anomalies in the bale being progressively formed, and thus enable the unit (conveniently programmed and/or provided with adapted software) to promptly intervene, by driving the actuator 5 and thus the movement of the agricultural machine A.

In an embodiment of significant practical interest, shown in the accompanying figures for the purposes of non-limiting example of the application of the invention, the first member 2 comprises a first fork 10, which defines a first rotatable accommodation seat for a first pivot 11 that is arranged according to the first rotation axis F and is coupled to the second member 3.

With further reference to the embodiment shown in the accompanying figures, the first fork 10 of the first member 2 is rigidly fixed, according to a configuration selected from a plurality of different configurations (which can be obtained according to the methods that will be explained in the paragraphs below), to a supporting bracket 12 for a pair of contoured bars 13.

Figure 6:
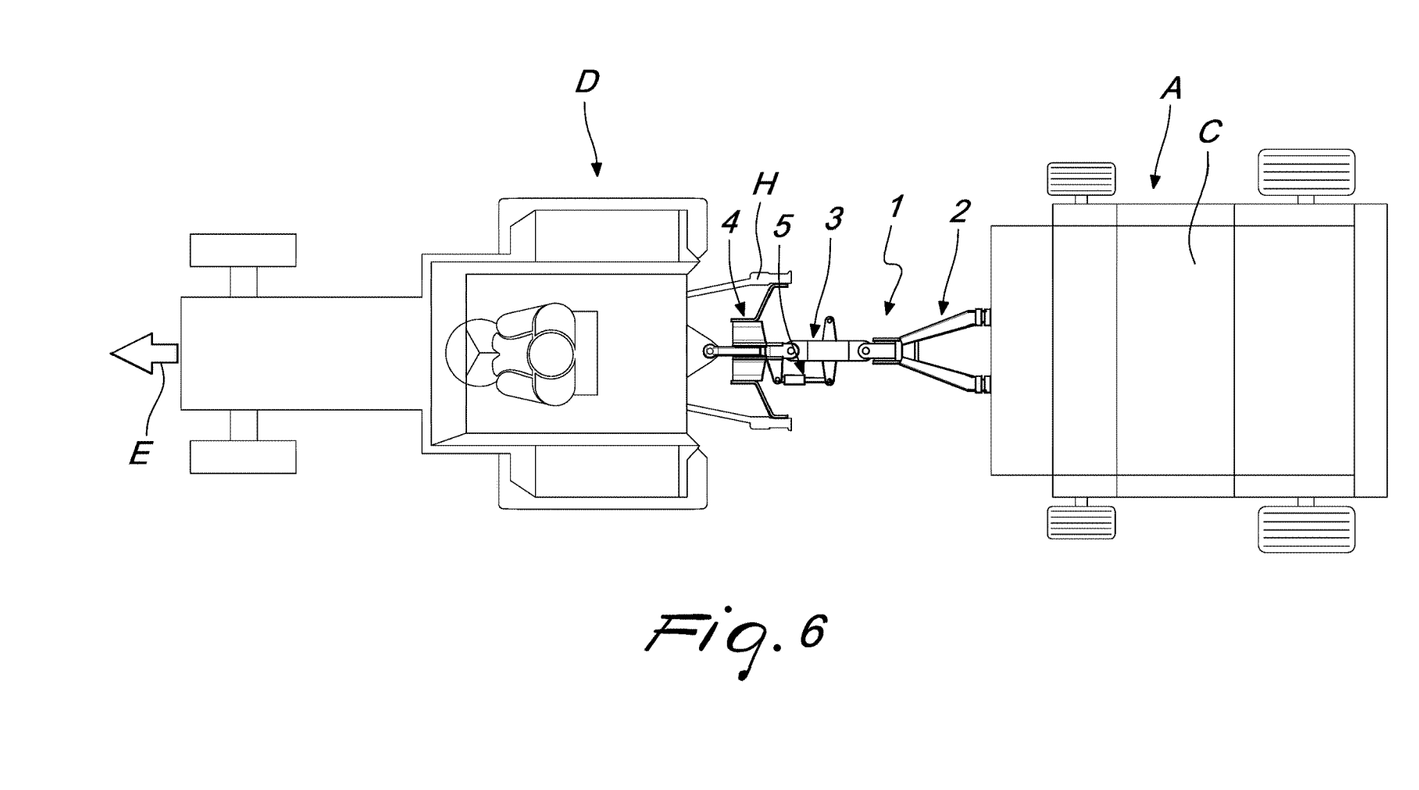
FIGS. 6 to 8 are schematic views from above of the towing of an agricultural machine by a tractor by way of the apparatus according to the invention, and show the operation thereof.
Figure 7:
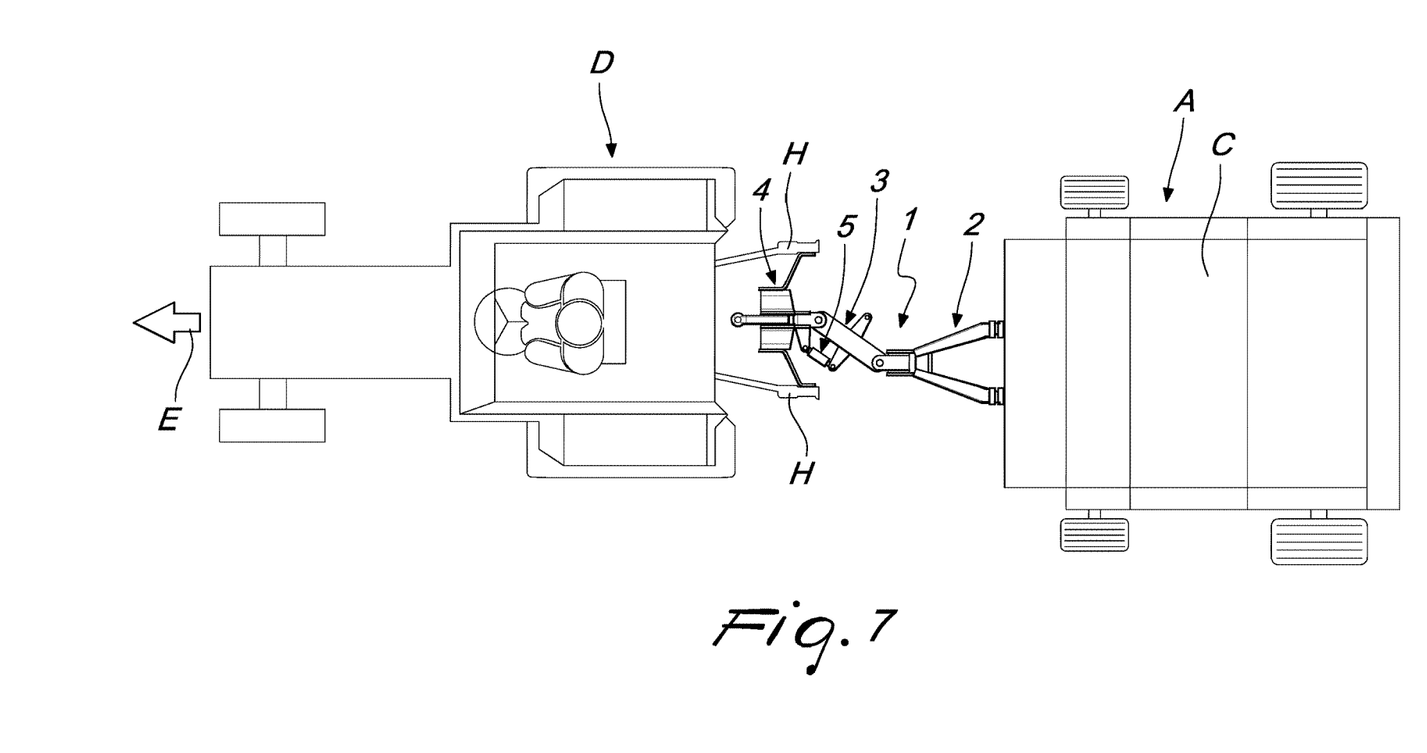
Figure 8:
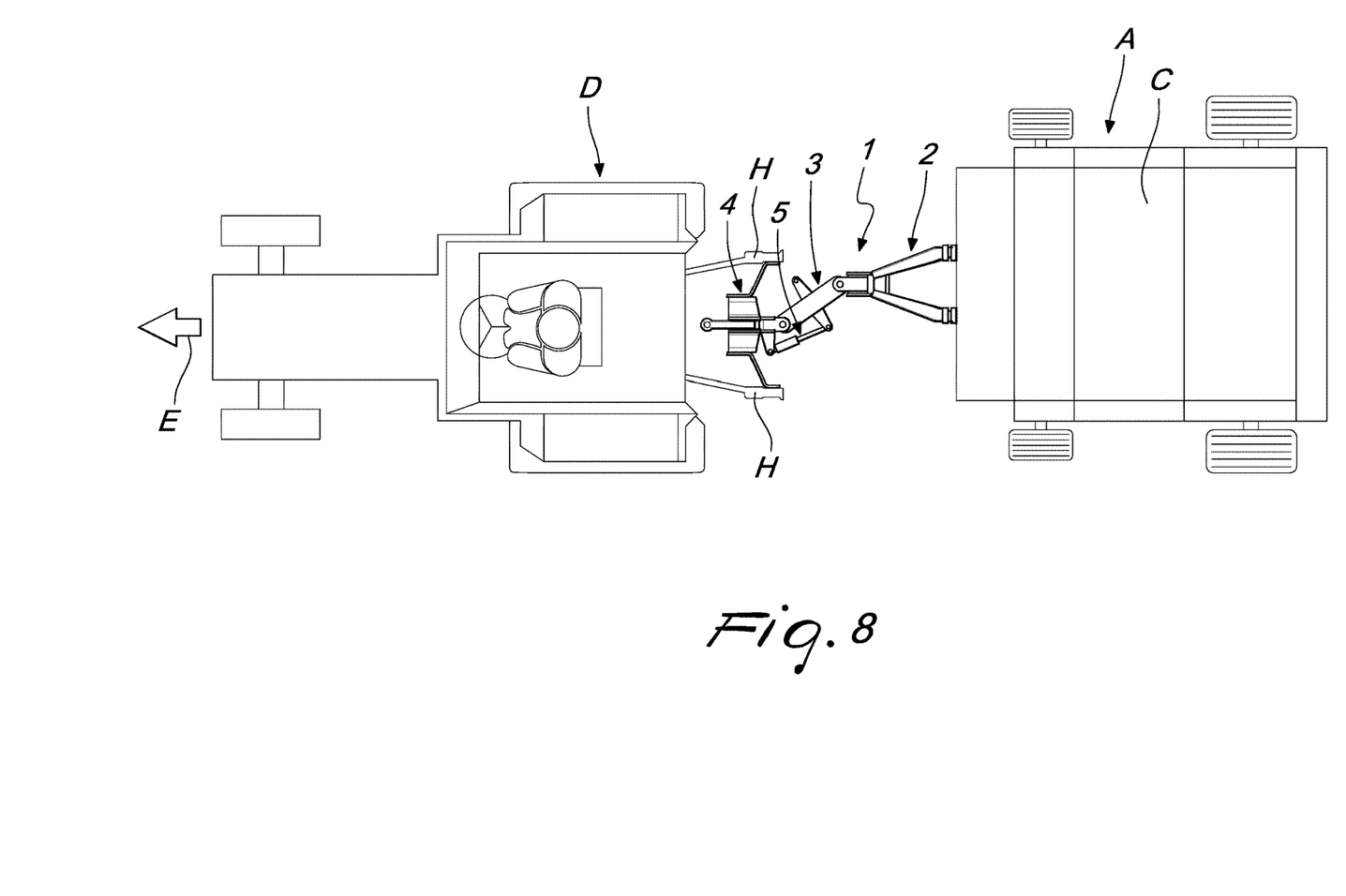

As schematically shown for example in FIGS. 6, 7 and 8, (and according to methods that are also conventional), in turn the contoured bars 13 can be rigidly anchored to the agricultural machine A so as to obtain the coupling between the towing apparatus 1 according to the invention and the agricultural machine A.

In order to obtain the possibility of rigid fixing according to a plurality of different configurations, as previously mentioned, the supporting bracket 12 and the first fork 10 have a plurality of respective slots 14: thus, at least some selected such slots 14 can be mutually aligned (in the mounting step) in order to be able to insert first fixing elements therein, of the type of nails, rivets, screws, and the like.

So assuming, for example, that the supporting bracket 12 and the bars 13 (which are fixed to the agricultural machine A) are kept immobile, in the mounting step it is possible to make the first fork 10 slide with respect to the bracket 12, while still being able to arrive at the mutual alignment between at least some slots 14, and thus, consequently, the rigid fixing of the bracket 12 to the first fork 10 according to a configuration selected from a plurality of different configurations.

In the embodiment shown for the purposes of non-limiting example in the accompanying figures, the third member 4 comprises a second fork 15, which defines a second rotatable accommodation seat for a second pivot 16 that is arranged along the second rotation axis G and is coupled to the second member 3.

Even more specifically, the second fork 15 is fixed to a pair of contoured plates 17, which can be rigidly anchored to the tractor D (according to methods that will be explained in the paragraphs below), so as to obtain the coupling between the tractor D and the towing apparatus 1 according to the invention.

Advantageously, the plates 17 support, according to an arrangement selected from a plurality of different arrangements, a rigid support 18 of a towing eye 19, which can be coupled rotatably to a fixed pin that is integral with the tractor D.

More specifically, the plates 17 and the support 18 have a plurality of respective holes 20: in a substantially similar fashion as that for the first fork 10 and the bracket 12, at least some selected such holes 20 can be mutually aligned, in order to insert second fixing elements therein, of the type of nails, rivets, screws, and the like.

So again, in the mounting step it is possible to move the support 18 with respect to the plates 17 (or vice versa), until the mutual alignment is reached of at least some holes 20, and thus, consequently, the rigid coupling is obtained between the towing eye 19 and the plates 17, and the second fork 15, according to a mutual arrangement selected from a plurality of different mutual arrangements.

The holes 20 and the slots 14 thus make it possible to obtain repeated course corrections, corresponding to mutual deployments of the three members 2, 3 and 4, and thus offer a first possibility of adapting the apparatus 1 according to the invention to the specific dimensions of the machine A and of the tractor D that is to tow it.

The coupling between the third member 4 and the tractor D is finally completed by S-shaped metal sheets 21: each sheet 21 is in fact welded to a respective plate 17 and, at the opposite end, defines an orifice 22 that can be aligned with a respective slit that is provided on a corresponding beam H that protrudes from the rear of the tractor D, so as to allow the insertion of a locking element.

Conveniently, in the preferred embodiment, one of the plates 17 defines a pair of protruding tabs 7, mutually parallel, which rotatably support the jacket 6 of the hydraulic cylinder.

With further reference to the preferred, non-limiting embodiment of the application of the invention, the second member 3 is constituted substantially by a profiled element that defines, at its mutually opposite end portions 3a, 3b, the first pivot 11 and the second pivot 16.

Even more specifically, the profiled element is substantially made up of the two above mentioned end portions 3a, 3b, mutually parallel, and of an intermediate portion 3c, inclined (and in any case aligned, in the longitudinal direction, with the two end portions 3a, 3b).

Figure 4:
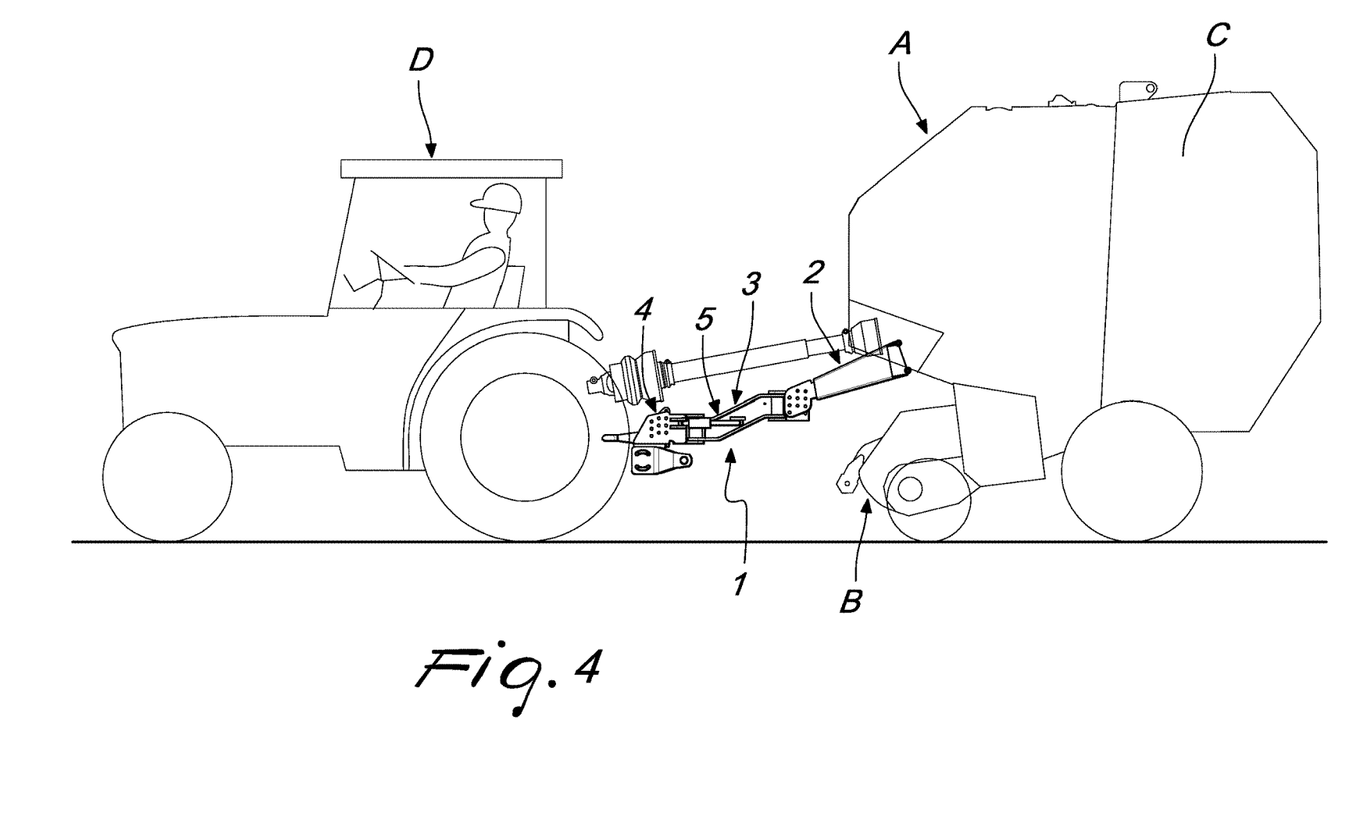
FIG. 4 is a schematic side view of the towing of an agricultural machine by a tractor, by way of the apparatus in FIG. 1.
Figure 5:
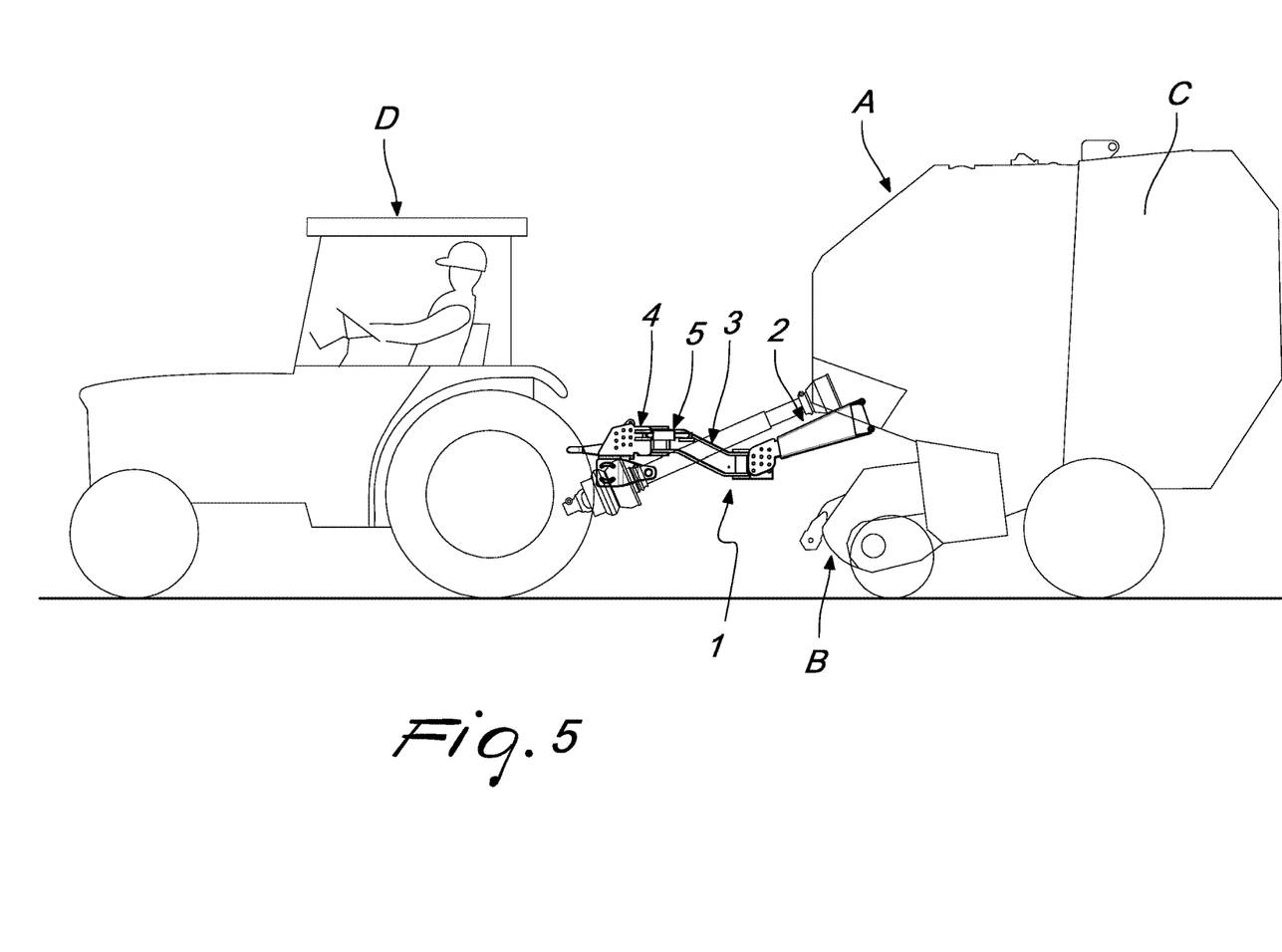
FIG. 5 is a schematic side view of the towing of an agricultural machine, using a different mounting arrangement, by a tractor, by way of the apparatus in FIG. 1.

Thus, thanks to the non-rectilinear progression thus defined for the profiled element that constitutes the second member 3, it is possible to rotatably couple the second member 3 to the first member 2 according to at least two different mounting options (which are clearly shown in FIGS. 4 and 5).

In the first mounting option (FIG. 4), which is obtainable by conveniently orienting the profiled element, the first pivot 11 is arranged at a higher vertical height with respect to the second pivot 16, and consequently with respect to the towing eye 19, and it is thus possible to use the towing apparatus 1 according to the invention in order to tow agricultural machines A by way of tractors D that have the fixed pin (and more generally the towing elements) at a low height from the ground.

Vice versa, in the second mounting option (FIG. 5), which is obtained starting from the first by rotating, ideally through 180°, the profiled element about the advancement direction E, the first pivot 11 is arranged at a lower vertical height with respect to the second pivot 16, and consequently with respect to the towing eye 19. In the second mounting option it is thus possible to use the towing apparatus 1 according to the invention in order to tow agricultural machines A by way of tractors D which have the fixed pin (and more generally the towing elements) at a high distance from the ground.

It should be noted that in a first implementation of the concepts explained above, the towing apparatus 1 can be sold with two different second members 3, each one of which is provided with a respective protruding crest 9 and can be coupled rotatably with a same first member 2 and a same third member 4. Thus, each second member 3 can as needed provide a respective mounting option, of the two described above.

Preferably, in order to keep down costs and simplify logistics management, the (same) second member 3 defines two protruding crests 9, which, as can be seen from the accompanying figures, are arranged at the mutually opposite sides of the intermediate portion 3c.

Thus, in each one of the at least two mounting options described above, the free end of the piston 8 can be articulated to a respective protruding crest 9 of the (same) second member 3.

It should be noted that the two mounting options described in the foregoing paragraphs (and illustrated in FIGS. 4 and 5) do not exhaust the possible mounting options of the apparatus 1, while remaining within the scope of protection claimed herein.

Firstly in fact, the members 2, 3 and 4 (and optionally the actuator 5) are mutually coupled in a different manner to that outlined above, so as to obtain further mounting arrangements.

Furthermore, the possibility is not ruled out of providing second members 3 (and/or optionally first members 2 and third members 4) of different shapes and dimensions, for the express purpose of ensuring, in the assembly step, the possibility to choose further mounting options.

Moreover, as has previously been seen, each one of the two mounting options described in detail corresponds on its own in effect to innumerable modes of mutual fixing between the supporting bracket 12 and the first fork 10 (thanks to the slots 14), as with between the plates 17 and the support 18 (thanks to the holes 20), and this, on the basis of just the two mounting options shown, makes it possible to obtain a virtually infinite number of configurations.

Operation of the towing apparatus according to the invention is the following.

During normal agricultural activities, and according to substantially conventional methods, the machine A can be towed by the tractor D in order to be moved along a piece of agricultural land: the tractor D follows a rectilinear course, usually defined by the windrows that were provided previously, and behind it the gathering device B picks up the agricultural products, to feed to the chamber C and progressively form the bale.

Thus, for as long as the process of formation occurs properly, the members 2, 3 and 4 are substantially aligned along the advancement direction E (as in FIG. 6) and the agricultural machine A, towed by the tractor D, continues in turn along the advancement direction E.

When the control unit detects anomalies in the bale formation process (according to the methods described previously), owing to, as has been seen, an uneven distribution of the agricultural products on the ground, it activates the actuator 5.

The sliding of the piston 8 within the jacket 6 thus determines the rotation, about the second axis G, of the second member 3 with respect to the third member 4 (which is integral with the tractor D and thus, in fact, fixed) and, consequently, the rotation of the first member 2 with respect to the second member 3 about the first axis F.

As a consequence, the agricultural machine A is forced to perform a translational motion at right angles to the advancement direction E (proportionally to the extent, variable at will, of the rotation imposed on the second member 3 by the piston 8), thus bringing itself for example into one of the two positions illustrated in FIGS. 7 and 8 (which correspond to the rotations in the two directions of the second member 3, which in turn depend on the sliding of the piston 8 in the two opposite directions).

Thus, the towing apparatus 1 ensures the correct formation of the bale under all operating conditions, in that it enables the machine A to follow the irregularities of formation of the windrow and/or move toward the region of the ground on which the agricultural products are piled the most, without requiring any course correction of the tractor D, which can thus freely proceed in its rectilinear motion along the advancement direction E.

Thanks to the towing apparatus 1, the feeding of the chamber C can thus still occur with sufficient evenness, even when, by contrast, the distribution of the agricultural products is not uniform (a situation that, as has been seen, with conventional agricultural machines results in an inadequate filling of the chamber and the formation of uneven bales).

Moreover, such result is obtained entirely automatically (thanks to the sensors and to the control unit), without requiring any intervention of the driver or other operator, who can in fact ignore the distribution of the agricultural products on the ground.

Obviously, the possibility is not excluded of providing towing apparatuses 1 according to the invention in which control of the actuator 5 is entrusted (exclusively, or as an alternative to the control unit) to the driver (or other human operator), where the specific requirements make it preferable.

It should furthermore be noted that the towing apparatus 1 is undoubtedly versatile, thanks to the numerous possibilities (described previously) for adjustment and adaptation of the three members 2, 3 and 4, to the specific dimensions of the machine A and of the tractor D, and to the specific requirements (and to the regulations).

In fact, it has been seen that the holes 20 and the slots 14 make it possible to modify the mutual arrangements of the three members 2, 3 and 4 at will, thus adapting the encumbrances, and in general the dimensions and the distances between centers, to the specific requirements.

Furthermore, the various mounting options that can be obtained make it possible to adapt the towing apparatus 1 according to the invention to the different operating conditions under which the agricultural machines A and the tractors D must operate in each instance, in relation in particular to the vertical height at which to perform the coupling between the various components involved in the towing and more generally in relation to the different tow hook systems that various national regulations impose.

In practice it has been found that the towing apparatus according to the invention fully achieves the set aim and objects in that the use of a first member, which can be coupled to an agricultural machine and is associated with a second member, which in turn is associated with a third member that can be coupled to a tractor, for towing the agricultural machine, with either or both of the first member and the second member being controlled by at least one respective actuator, makes it possible to move the agricultural machine at least partially independently of the advancement of the tractor and therefore ensures the optimal formation of the bale, even in the event of uneven distribution on the ground of the agricultural products to be picked up and compressed.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in EPA No. 14425131.1 from which this application claims priority are incorporated herein by reference.

Where the technical features mentioned in any claim are followed by reference numerals and/or signs, those reference numerals and/or signs have been included for the sole purpose of increasing the intelligibility of the claims and accordingly, such reference numerals and/or signs do not have any limiting effect on the interpretation of each element identified by way of example by such reference numerals and/or signs.

The invention claimed is:

1. A towing apparatus connectable to a tractor, the towing apparatus comprising:
    a baler, including at least one gathering device for gathering previously-cut agricultural products, and a chamber for accommodation and compression of the agricultural products, for forming of a bale, the agricultural products being received by the chamber from the gathering device;
    a first member connectable to the baler;
    a second member, including a first pivot coupled to the first member;
    a third member coupled to the second member, wherein the third member is connectable to the tractor for towing the baler; and
    at least one actuator, that controls either or both of the first member and the second member, for moving the baler at least partially independently of an advancement of the tractor, wherein:
    the first member has a respective first end, rigidly couplable to the baler, and a respective second end, opposite of the respective first end, pivoted to the second member to rotate about a first axis, directed along a substantially vertical direction; and the third member has a respective first end, rigidly couplable to the tractor, and a respective second end, opposite of the respective first end and connected to the second member.

2. The towing apparatus according to claim 1, wherein the third member includes a protruding contoured tab and the second member includes a protruding contoured crest, and wherein the at least one actuator comprises:
    a hydraulic cylinder;
    a cylindrical jacket, articulated with one of its ends to said protruding contoured tab; and
    a piston, slidable within the jacket and including a free end articulated to said protruding contoured crest.

3. The towing apparatus according to claim 1, further comprising automatic means of control and management of the at least one actuator, said automatic means being configured for automatically activating the at least one actuator, to automatically move the baler independently of an advancement direction of the tractor.

4. The towing apparatus according to claim 3, wherein the automatic means of control and management comprise:
    at least one pressure sensor, arranged inside the chamber of the baler for detecting a pressure value of the bale; and
    an electronic unit that drives the actuator, said electronic unit being associated with the at least one pressure sensor, to automatically activate the actuator in response to irregularities in the bale formation process, said irregularities being detectable by monitoring the pressure value detected by the at least one pressure sensor.

5. The towing apparatus according to claim 1, wherein the first member comprises a first fork, wherein the first fork defines a first rotatable accommodation seat for the first pivot, the first pivot being arranged along the first rotation axis.

6. The towing apparatus according to claim 5, wherein the first member comprises:
    a pair of contoured bars, rigidly anchorable to the baler; and
    a supporting bracket for the pair of contoured bars, said supporting bracket being rigidly fixable to the first fork.

7. The towing apparatus according to claim 6, wherein the supporting bracket and the first fork have a plurality of respective slots, wherein the supporting bracket is fixable to the first fork in a plurality of different configurations, said configurations being selectable by aligning a group of slots of the first fork with a correspondent group of slots of the supporting bracket and by inserting first fixing elements therethrough.

8. The towing apparatus according to claim 1, including a second pivot, wherein the third member comprises a second fork, defining a second rotatable accommodation seat for the second pivot, the second pivot being arranged along a second rotation axis.

9. The towing apparatus according to claim 8, wherein the third member comprises:
    a pair of contoured plates that can be rigidly anchored to the tractor;
    a towing eye that can be rotatably coupled to a fixed pin, said fixed pin being integral with the tractor; and
    a rigid support for supporting said towing eye, said rigid support being fixed to the pair of contoured plates.

10. The towing apparatus according to claim 9, wherein the pair of contoured plates and the rigid support have a plurality of respective holes, wherein the pair of contoured plates are fixable to the rigid support in a plurality of different configurations, said configurations being selectable by aligning a group of holes of the pair of contoured plates with a correspondent group of holes of the rigid support and by inserting second fixing elements therethrough.

11. The towing apparatus according to claim 9, wherein the at least one actuator comprises:
    a hydraulic cylinder;
    a cylindrical jacket;
    a piston, slidable within the jacket, and wherein one of the contoured plates of said pair of contoured plates includes a pair of the protruding tabs, mutually parallel, connected to the jacket of the hydraulic cylinder.

12. The towing apparatus according to claim 10, wherein the second member includes a profiled element, the profiled element defining, at mutually opposite end portions thereof, respective seats for the first pivot and for the second pivot.

13. The towing apparatus according to claim 12, wherein the profiled element includes:
   the mutually opposite end portions, elongated along a horizontal direction;
   an intermediate portion, elongated along an inclined direction, said inclined direction being inclined with respect to the horizontal direction, wherein the towing apparatus is mountable in a first mounting option, wherein in the first mounting option the first pivot is arranged at a higher vertical height with respect to the second pivot, and in a second mounting option, wherein in the second mounting option the first pivot is arranged at a lower vertical height with respect to the second pivot.

14. The towing apparatus according to claim 13, wherein the at least one actuator comprises:
   a hydraulic cylinder,
   a cylindrical jacket, and
   a piston, slidable within the jacket and having a free end; and
   wherein the second member includes a first crest and a second crest, arranged at mutually opposite sides of the intermediate portion, wherein, in the first mounting option, the free end of the piston is articulated to the first protruding crest and, in the second mounting option, the free end of the piston is articulated to the second protruding crest.

* * * * *